(No Model.)  2 Sheets—Sheet 1.
M. HARCZYK.
PRESS MOLD FOR MANUFACTURING DUTCH TILES, &c.
No. 544,786. Patented Aug. 20, 1895.
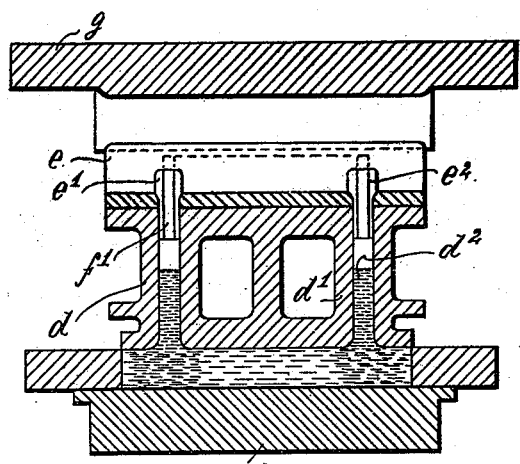
Fig. 1.
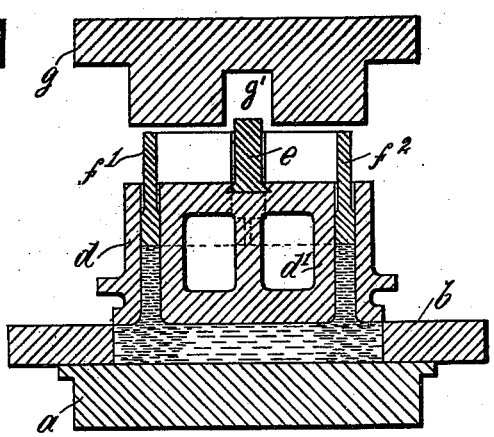
Fig. 2.
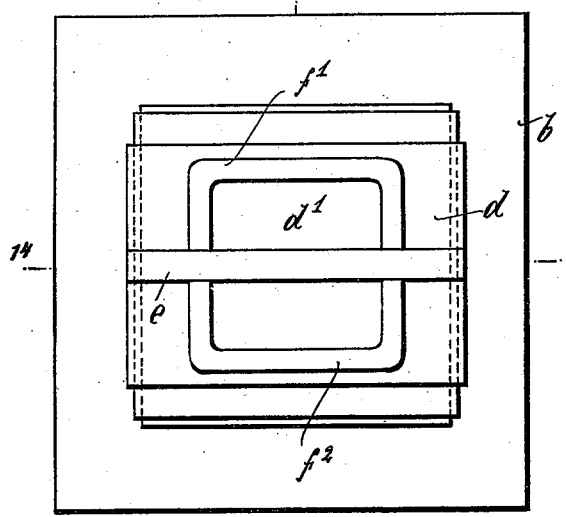
Fig. 3.
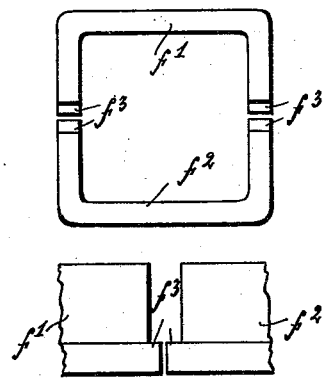
Fig. 4.
Fig. 5.
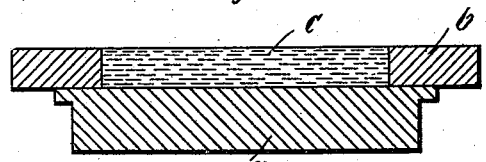
Fig. 6.
Witnesses:
Arthur Walther
Emil Kayser
Inventor:
Maximilian Harczyk
by Robert Deisler
Attorney.

(No Model.) 2 Sheets—Sheet 2.
M. HARCZYK.
PRESS MOLD FOR MANUFACTURING DUTCH TILES, &c.
No. 544,786. Patented Aug. 20, 1895.

Witnesses:
Arthur Walther
Emil Hayser

Inventor:
Maximilian Harczyk
by Peter Deiple
Attorney.

UNITED STATES PATENT OFFICE.

MAXYMILIAN HARCZYK, OF WARSCHAU, RUSSIA.

PRESS-MOLD FOR MANUFACTURING DUTCH TILES, &c.

SPECIFICATION forming part of Letters Patent No. 544,786, dated August 20, 1895.

Application filed July 14, 1894. Serial No. 517,605. (No model.)

*To all whom it may concern:*

Be it known that I, MAXYMILIAN HARCZYK, a subject of the Emperor of Prussia, and a resident of Warschau, in the Province of Poland, in the Empire of Russia, have invented certain new and useful Improvements in and Relating to Press-Molds for the Manufacture of Dutch Tiles and other Stove Parts with Flanges, of which the following is an exact specification.

This invention relates to an improved press-mold for the manufacture of Dutch tiles and other stove parts provided with flanges.

The purpose of my invention is to manufacture such articles from powdered materials by exposing the latter to pressure in such a manner that the body or tile proper is pressed but once. The flange, however, is pressed twice, all as will be more fully described hereinafter.

In order to make my invention more clear, I refer to the accompanying drawings, in which similar letters denote similar parts throughout the different views, and in which—

Figure 12:
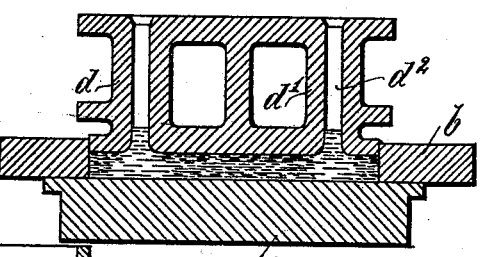
Figure 13:
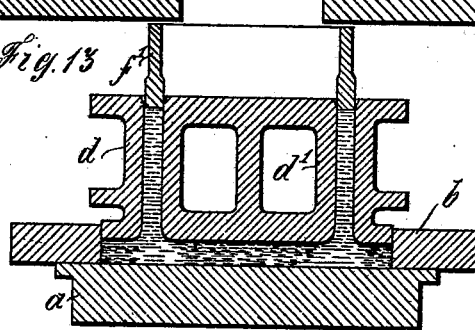

Figure 1 is a vertical longitudinal section through the press-mold, taken on line 14 15 of Fig. 3. Fig. 2 is a vertical cross-section through the same, taken on line 16 17 of Fig. 3. Fig. 3 is a plan of the mold. Fig. 4 is a detail of the same. Fig. 5 is also a detail drawn on a larger scale. Figs. 6 to 11 represent the various stages occurring in forming a Dutch tile by means of the above press-mold. Figs. 12 and 13 represent two stages occurring if the several parts of the mold are employed in another order.

Referring to Figs. 1 to 5, $a$ designates a slide forming the lowest part of the mold and adapted to carry the other parts of the same between the cheeks of a press. $b$ is a flat frame resting on slide $a$ and forming with the latter a shallow vessel adapted to receive the material $c$ for the tile proper, Fig. 6.

Figure 7:
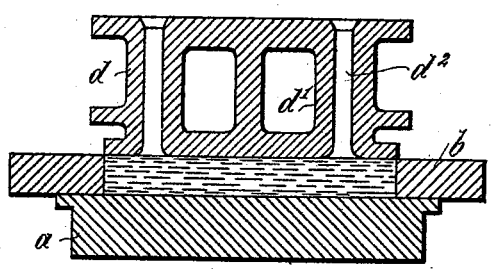
Figure 8:
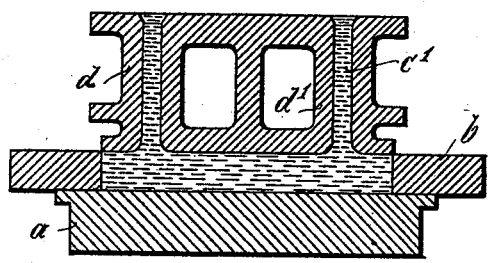
Figure 9:
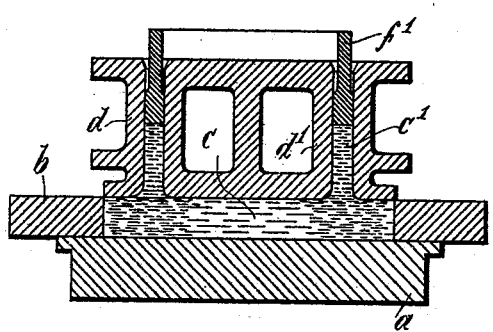
Figure 10:
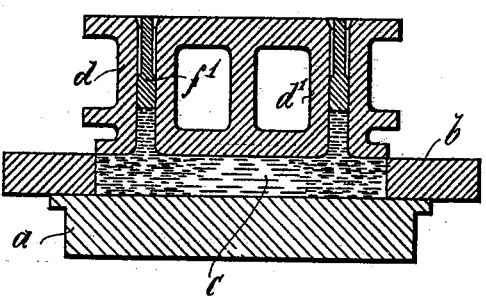
Figure 11:
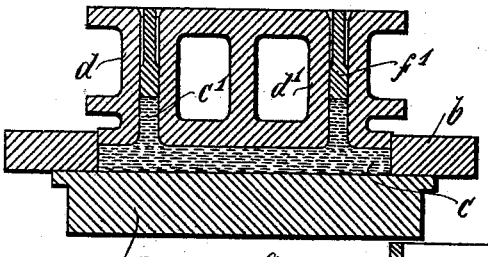

$d$ designates a hollow stamp embracing another stamp $d'$ and forming with the latter a space $d^2$, adapted to receive the material $c'$ for the flange, Fig. 8. The parts $d$ and $d'$ thus form a stamp as well as a mold. Both parts are firmly connected by means of a ledge $e$, Figs. 1 and 2, provided with dovetails and having two cut-outs $e'$ $e^2$ opening downward directly over the space $d^2$ aforementioned. Into this space may be lowered a bipartite stamp $f'$ $f^2$, Figs. 1 to 5. Each half of this stamp is cut away at $f^3$ to give room for the ledge $e$. If, now, frame $b$, Fig. 6, has been filled with the powdered material, stamp $d$ $d'$ is put upon the latter, Fig. 7, and is firmly connected with slide $a$ by any suitable means. Space $d^2$ is also filled then with the mass, Fig. 8. The bipartite stamp $f'$ $f^2$ is put upon the mass $c'$, and the whole is brought into a press, the upper cheek of which is shaped as shown at $g$ in Figs. 1 and 2. This cheek is provided with a groove $g'$, adapted to take over ledge $e$ if the cheek is lowered or pressed down upon stamp $f'$ $f^2$, respectively, Figs. 1 and 2. Portion $c'$ of the mass is thus compressed and turned into a comparatively-solid body—*i. e.*, the flange of the Dutch tile or other stove portion just manufactured. (Compare the hatched lines indicating the portions $c$ and $c'$ of the material in Figs. 9 and 10.) As soon as stamp $f'$ $f^2$ has entered the space $d^2$ completely, Fig. 10, the fast connection between the mold or stamp $d$ $d'$ and the slide $a$ is broken. Both stamps $f'$ $f^2$, as well as $d$ $d'$, are pressed down now simultaneously upon the material contained within frame $b$, Fig. 11, so that also this material $c$ is compressed and turned into a comparatively-solid body—*i. e.*, the tile proper. It will be observed that also the flange is still further compressed during this operation, or, in other words, is compressed a second time.

Instead of pressing the flange at first and the body of the Dutch tile afterward, I may reverse these operations, as shown in Figs. 12 and 13. In this case I proceed as follows: After frame $b$ has been filled stamp $d$ $d'$ is put upon the material and pressed down upon the same, Fig. 12. Space $d^2$ is filled then with the material requisite for the flange, Fig. 13, and the bipartite stamp $f'$ $f^2$ is pressed down as far as possible, Fig. 11, when the whole operation will be completed.

Having thus fully described the nature of my invention, what I desire to secure by Letters Patent of the United States is—

As a means for manufacturing Dutch tiles and other flanged stove-parts, the combination with a press-mold adapted to produce the body or tile proper of the article, of a double stamp consisting of an outer stamp and an inner one, said double-stamp being adapted to form the mold for the flange or flanges of the article, and to receive a bipartite stamp adapted to be pressed down into the main-stamp independent of the latter, for the purpose as described.

In testimony whereof I have signed this specification in the presence of two subscribing witnesses.

MAXYMILIAN HARCZYK. [L. S.]

Witnesses:
  JOSEF STROSS,
  S. MOROSEN.